United States Patent [19]
Yamamoto et al.

[11] Patent Number: 5,988,891
[45] Date of Patent: Nov. 23, 1999

[54] ROLLING BEARING APPARATUS

[75] Inventors: Toyohisa Yamamoto; Takahiko Uchiyama, both of Kanagawa, Japan

[73] Assignee: NSK Ltd., Tokyo, Japan

[21] Appl. No.: 09/135,401

[22] Filed: Aug. 18, 1998

[30] Foreign Application Priority Data

Aug. 19, 1997 [JP] Japan .................................. 9-236448
Jul. 17, 1998 [JP] Japan .................................. 10-203778

[51] Int. Cl.⁶ .................................................. F16C 33/44
[52] U.S. Cl. ........................................ 384/463; 384/527
[58] Field of Search .............................. 384/463, 527, 384/576, 534, 523

[56] References Cited

FOREIGN PATENT DOCUMENTS 2190614  7/1990  Japan .
4351319  12/1992  Japan .
627857  7/1994  Japan .
821448  1/1996  Japan .

*Primary Examiner*—Lenard A. Footland
*Attorney, Agent, or Firm*—Sughrue, Mion, Zinn, Macpeak & Seas, PLLC

[57] ABSTRACT

A rolling bearing apparatus is disclosed, which have a cage disposed between an inner ring raceway track and an outer ring raceway track in a freely rotatable manner so as to guide and hold a plurality of rolling elements, wherein said cage is made of a resin composition which comprises a melt-moldable fluororesin as the main component and further contains at least one solid lubricant having an average particle diameter of from 0.1 to 60 μm and a fibrous filler having an aspect ratio of from 3 to 200.

The rolling bearing apparatus is inexpensive and, in particular, is capable of retaining lubricity over long even in a high-temperature environment and is reduced in the outward flying of particles therefrom.

7 Claims, 9 Drawing Sheets

INFLUENCE OF THE AVERAGE PARTICLE DIAMETER OF PTFE (200°C)
(PFA: 60 wt%, PTFE: 20 wt%, POTASSIUM TITANATE WHISKERS: 20 wt%)

INFLUENCE OF THE AVERAGE PARTICLE DIAMETER OF PTFE (200°C)
(PFA: 60 wt%, PTFE: 20 wt%, POTASSIUM TITANATE WHISKERS: 20 wt%)

FIG. 5

INFLUENCE OF THE ASPECT RATIO OF FIBERS (200°C)
(PFA: 60 wt%, PTFE: 20 wt%, POTASSIUM TITANATE WHISKERS: 20 wt%)

FIG. 6

INFLUENCE OF THE PROPORTION OF PTFE (200°C)
(PFA, PTFE, POTASSIUM TITANATE WHISKERS: 20 wt%)
(ETFE, PTFE, POTASSIUM TITANATE WHISKERS: 20 wt%)

FIG. 7

INFLUENCE OF THE PROPORTION OF FLUOROMICA B (200°C)
(PFA, FLUOROMICA B, POTASSIUM TITANATE WHISKERS: 20 wt%)
(ETFE, FLUOROMICA B, POTASSIUM TITANATE WHISKERS: 20 wt%)

FIG. 8

INFLUENCE OF THE PROPORTION OF MELAMINE CYANURATE (200°C)
(PFA, MELAMINE CYANURATE, POTASSIUM TITANATE WHISKERS: 20 wt%)
(ETFE, MELAMINE CYANURATE, POTASSIUM TITANATE WHISKERS: 20 wt%)

FIG. 9

INFLUENCE OF THE PROPORTION OF AMINO ACID COMPOUND (200°C)
(PFA, AMINO ACID COMPOUND, POTASSIUM TITANATE WHISKERS: 20 wt%)
(ETFE, AMINO ACID COMPOUND, POTASSIUM TITANATE WHISKERS: 20 wt%)

FIG. 10

INFLUENCE OF THE PROPORTION OF PTFE (200°C)
(PFA, PTFE, ALUMINUM BORATE WHISKERS: 20 wt%)
(ETFE, PTFE, ALUMINUM BORATE WHISKERS: 20 wt%)

ROLLING BEARING APPARATUS

FIELD OF THE INVENTION

The present invention relates to a rolling bearing apparatus which is suitable for use especially in clean rooms and in apparatuses requiring a clean atmosphere, such as apparatuses for producing semiconductors, liquid-crystal panels, hard disks, etc., and which is usable even in a severe environment where a lubricating oil, a grease, or the like is generally unusable, such as a high-temperature or vacuum atmosphere, a special atmosphere, a very-low-temperature atmosphere, a radiation exposure atmosphere, etc.

BACKGROUND OF THE INVENTION

Conventional rolling bearing apparatus are constituted of an inner ring having an inner ring raceway track on its outer periphery, an outer ring having an outer ring raceway track on its inner periphery, a plurality of rolling elements interposed between the inner ring raceway track and the outer ring raceway track in a freely rollable manner, and a cage disposed between the inner ring raceway track and the outer ring raceway track in a freely rotatable manner so as to guide and hold the rolling elements.

The lubrication of a rolling bearing apparatus is generally conducted by circulating a lubricating oil or grease or by enclosing a lubricating oil or grease in the bearing apparatus. However, when the bearing apparatus works, the lubricating oil or grease flies off or vaporizes to emit a gas, especially at high temperatures in a vacuum environment or the like, to thereby contaminate the atmosphere surrounding the bearing apparatus. Because of this, neither a lubricating oil nor a grease can be used in clean rooms or apparatuses requiring a clean atmosphere, such as apparatuses for producing semiconductors, liquid-crystal panels, hard disks, etc., or in a severe environment such as a high-temperature or vacuum atmosphere, a special atmosphere, a very-low-temperature atmosphere, or a radiation exposure atmosphere.

JP-A-55-57717 (the term "JP-A" as used herein means an "unexamined published Japanese patent application") and JP-A-61-55410 disclose a lubrication technique which comprises forming beforehand a thin lubricating film consisting of molybdenum disulfide, tungsten disulfide, graphite, silver, lead, gold, etc. by sputtering, ion plating, baking, thermal spraying, etc. on part or all of the inner ring, outer ring, cage, and rolling elements.

In JP-A-62-151539 and JP-A-64-79418 is disclosed a lubrication technique in which a cage made of an sintered alloy obtained from a mixture of a solid lubricant, e.g., molybdenum disulfide, tungsten disulfide, graphite, or hexagonal boron nitride, and a metal powder is used to allow a component of the cage to be released from the cage due to frictional contact between the cage and the rolling elements and deposit on the rolling elements, inner ring, and outer ring to form a thin lubricating film thereon.

Furthermore, JP-A-2-245514, JP-A-4-102718, and Japanese Patent 2,709,119 disclose a lubrication technique in which a cage made of a resin composition comprising a plastic, a solid lubricant, etc. is used to allow a component of the cage to be released from the cage due to frictional contact between the cage and the rolling elements and deposit on the rolling elements, inner ring, and outer ring to form a thin lubricating film thereon.

On the other hand, with the trend toward performance elevation, yield increase, etc. in devices and apparatuses, the conditions under which processes are conducted are becoming severer. Namely, the severe conditions such as higher temperatures, higher degrees of vacuum, etc. are required. With respect to the bearing apparatuses used therein, it is required to be reduced in the outward flying of particles therefrom and to work smoothly over long in severe environments, e.g., in a higher-temperature atmosphere or a higher degree of vacuum. These requirements are becoming higher year by year.

However, the lubrication technique due to a thin lubricating film formed previously, as disclosed in JP-A-55-57717, JP-A-61-55410, etc., generally has a short bearing life, because the lubricating film wears, as the bearing works, and finally disappears due to the frictional force in contact areas, resulting in no lubricating effect and hence in base metal (base material) adhesion/baking.

In the case where a cage is constituted of a sintered alloy, as disclosed in JP-A-62-151539 and JP-A-64-79418, this technique has a drawback that the cage is extremely expensive because a complicated shape cannot be formed and, hence, a desired cage shape must be formed from a rod or ring material or the like through mechanical processing. In addition, the use of a sintered alloy has the following drawbacks. Although sintered alloys are generally excellent in heat resistance, sintered alloys have low mechanical strength and are brittle. Accordingly since sintered alloys tend to occur surface cracks during mechanical processing, they have poor mechanical proccessability. For example, the processing rates for example, cutting speed and cut depth must be reduced. When a bearing apparatus employing such a sintered alloy cage works, crack may progressed from, e.g., the cracks generated during the processing. As a result, there are cases where the cage suffers abnormal wear, damage, or breakage to cause a large amount of particles to fly off the bearing apparatus or to make the bearing apparatus unable to work.

Furthermore, the prior art cage made of a resin composition as disclosed in JP-A-2-245514, JP-A-4-102718, Japanese Patent 2,709,119, etc. has a drawback that since the base resin material itself has insufficient lubricity, its lubricating effect is lost in an early stage after the bearing apparatus begins working. As a result, there are cases where the amount. of particles worn is rapidly increased and this causes a large amount of particles to fly off the bearing apparatus or causes the bearing to have a significantly increased torque and thus end its life. In addition, since this prior art cage has insufficient heat resistance due to the glass transition point and melting point of the resin material itself, the wear resistance and lubricity of the cage deteriorate considerably when the bearing apparatus works in a high-temperature environment. On the other hand, in the case where a tetrafluoroethylene resin having lubricity is employed as a base material, it is necessary to obtain a desired cage shape from a rod or ring material or the like through mechanical processing because the resin is not melt-moldable, as in the case of the sintered alloy described above. Hence, the cage thus produced is highly expensive.

As described above, conventional rolling bearing apparatuses have the following problems. Especially in a high-temperature environment, long-term lubrication is difficult and a large amount of particles fly off the bearing. Cages for use therein are extremely expensive because of the necessity of mechanical processing. Some materials for cages have poor mechanical proccessability, so that there are cases where trouble is generated when the bearing apparatuses are working.

SUMMARY OF THE INVENTION

The present invention has been achieved in view of such problems of the prior art techniques described above. An object of the present invention is to provide a rolling bearing apparatus which is inexpensive and, in particular, is capable of retaining lubricity over long even in a high-temperature environment and reduced in the outward flying of particles therefrom.

For accomplishing the above object, a rolling bearing apparatus is provided which has a cage disposed between an inner ring raceway track and an outer ring raceway track in a freely rotatable manner so as to guide and hold a plurality of rolling elements, wherein the cage is made of a resin composition which comprises a melt-moldable fluororesin as the main component and further contains at least one solid lubricant having an average particle diameter of from 0.1 to 60 μm and a fibrous filler having an aspect ratio of from 3 to 200.

For accomplishing the above object above, the preferred rolling bearing apparatus, is the above rolling bearing apparatus wherein the resin composition comprises a melt-moldable fluororesin as the main component and further contains in an amount of from 5 to 40 wt % based on the resin composition, at least one solid lubricant having an average particle diameter of from 0.1 to 60 μm selected from the group consisting of graphite, graphite fluoride, hexagonal boron nitride, fluoromicas, tetrafluoroethylene resins, melamine cyanurate (MCA), amino acid compounds having a laminar crystal structure, silver, and lead and in an amount of from 5 to 40 wt % based on the resin composition, fibrous filler having an aspect ratio of from 3 to 200.

For accomplishing the above object, the further preferred rolling bearing apparatus, is the above rolling bearing apparatus wherein the surfaces of the raceway tracks and the rolling elements have been partly or wholly coated with a film comprising at least one solid lubricant selected from the group consisting of graphite, graphite fluoride, hexagonal boron nitride, tetrafluoroethylene resins, silver, lead, molybdenum disulfide, and tungsten disulfide.

DESCRIPTION OF SYMBOLS 1 rolling bearing apparatus
2 inner ring
2a inner ring raceway groove
3 outer ring
3a outer ring raceway groove
4 rolling element
5 cage
61–64 curve
71–74 curve
81–84 curve
91–94 curve
101–104 curve

Detailed Description of the Invention

The rolling bearing apparatus (hereinafter, referred to as "the rolling bearing") of the present invention employs a cage containing a melt-moldable fluororesin as the main component. Consequently, not only the cage itself has satisfactory sliding properties, but also it has excellent suitability for mass-production because it can be produced through injection molding, which is a representative melt-molding technique. Furthermore, since the fluororesin used as the main component has excellent heat resistance, the material of the cage is reduced in thermal deterioration and retains wear resistance and lubricity even when the rolling bearing works in a high-temperature atmosphere. As a result, the generation of particles worn is inhibited and, hence, the number of particles flying off the rolling bearing is less.

In the preferred embodiment, since the cage is made of a resin composition which contains in an appropriate amount (preferably from 5 to 40 wt % based on the resin composition), at least one solid lubricant selected from the group consisting of graphite, graphite fluoride, hexagonal boron nitride, a fluoromica, a tetrafluoroethylene resin (powder), melamine cyanurate (MCA), an amino acid compound having a laminar crystal structure, silver, lead, molybdenum disulfide, or tungsten disulfide, the cage itself has further improved lubricity and thereby the frictional force generating in contact areas between the cage and the rolling elements is reduced. Such a solid lubricant, together with the base material (fluororesin) constituting the cage, is released from the cage and deposits on the rolling elements and on the raceway grooves of the inner and outer rings to thereby lubricate the bearing and, at the same time, reduce the frictional force generating in contact areas between the cage and the rolling elements. As a result, the cage-constituting material itself and the solid lubricating film formed on the rolling elements are reduced in wear.

In the further preferred embodiment, since a solid lubricating film having excellent heat resistance is formed, as described above, on the rolling elements and on the raceway grooves of the inner and outer rings due to the use of a solid lubricant having more excellent heat resistance than the fluororesin used as the main component, such as graphite, hexagonal boron nitride, a fluoromica, melamine cyanurate (MCA), or silver, lubricity is maintained even in the case where the temperature of local surface parts of the rolling elements, inner ring, and outer ring rises far beyond the temperature of the atmosphere in which the rolling bearing has been installed, due to the frictional force generating in contact areas between the rolling elements and the inner or outer rings when the rolling bearing works, for example, at a high speed.

In the still further preferred embodiment, since the cage contains an appropriate amount (preferably from 5 to 40 wt % based on the resin composition) of a fibrous filler having an aspect ratio of from 3 to 200, it has a mechanical strength sufficient for the required strength level. In addition, the formation of a film comprising at least one solid lubricant selected from graphite, graphite fluoride, hexagonal boron nitride, tetrafluoroethylene resins, silver, lead, molybdenum disulfide, and tungsten disulfide on part or all of the surfaces of the raceway tracks (i.e., raceway grooves) and the rolling elements is effective in preventing direct contact of the base materials of the cage, rolling elements, inner ring and outer ring in the initial stage of bearing working in which the film of the solid lubricant released from the cage has not yet deposited on the rolling elements and on the race grooves of the inner and outer rings. Namely, the increase in surface roughness caused by such direct contact can be prevented. Consequently, not only the bearing is in a satisfactorily lubricated state even in the initial stage of working to attain a low bearing torque, but also a component of the cage is satisfactorily released from the cage to deposit a solid lubricating film on the rolling elements and on the raceway grooves of the inner and outer rings. As a result, the solid lubricants are prevented from falling off the contact areas during wearing and during the deposition of a solid lubricating film. The rolling bearing therefore is reduced in the number of particles flying off the bearing and can maintain satisfactory lubricity over long.

The melt-moldable fluororesin used in the present invention is not particularly limited. Examples thereof include tetrafluoroethylene/perfluoroalkyl vinyl ether copolymers (hereinafter referred to as PFA), tetrafluoroethylene/ hexafluoropropylene copolymers (hereinafter referred to as FEP), poly(chlorotrifluoroethylene) (hereinafter referred to as PCTFE), tetrafluoroethylene/ethylene copolymers (hereinafter referred to as ETFE), chlorotrifluoroethylene/ ethylene copolymers (hereinafter referred to as ECTFE), and poly(vinylidene fluoride) (hereinafter referred to as PVDF). These may be used alone or in combination of two or more thereof. Preferred among these are PFA, FEP, and ETFE, because they are excellent in self-lubricating property and heat resistance. In the case where the bearing is used in a severe environment, for example, used at a higher temperature or at a higher speed, PFA is suitable.

The solid lubricant used in the present invention is at least one member selected from the group consisting of graphite, graphite fluoride, hexagonal boron nitride (hBN), fluoromicas, tetrafluoroethylene resin powders (PTFE), melamine cyanurate (MCA), amino acid compounds having a laminar crystal structure, silver, lead, molybdenum disulfide ($MOS_2$), and tungsten disulfide ($WS_2$). More preferred lubricating properties are obtained especially when one of graphite, hexagonal boron nitride, fluoromicas, tetrafluoroethylene resin powders, melamine cyanurate (MCA), amino acid compounds having a laminar crystal structure, silver, and tungsten disulfide or a combination of two or more of these is used. For example, in the case where the bearing is used both in a vacuum environment and in the atmosphere, a mixture of solid lubricants showing excellent lubricating properties respectively in the atmosphere and in vacuum is used. Specifically, a solid lubricant showing excellent lubricating properties mainly in the atmosphere, e.g., graphite or graphite fluoride, is mixed with a solid lubricant showing excellent lubricating properties mainly in vacuum, e.g., tungsten disulfide, molybdenum disulfide, silver, or lead, whereby satisfactory lubricating properties can be obtained both in a vacuum environment and in the atmosphere.

Although the average particle diameters of these solid lubricants are not particularly limited, the average particle diameters are preferably from 0.1 to 60 $\mu$m. The reasons are as follows. If a solid lubricant having a particle diameter of smaller than 0.1 $\mu$m is used, particle aggregation occurs during mixing with a base material, resulting in uneven particle dispersion. On the other hand, if solid lubricant particles having a particle diameter exceeding 60 $\mu$m are used, surface smoothness is impaired and there are cases where particles are caught in contact areas between the cage and the rolling elements or between the rolling elements and the raceway grooves to cause the bearing torque to fluctuate or increase rapidly, making the bearing unable to work any more. Although the content of the solid lubricant in the whole resin composition is not particularly limited, it is preferably from 5 to 40% by weight. The reasons are as follows. If the content thereof is lower than 5% by weight, there are cases where no improvement is observed in the wear resistance of the cage itself and in the lubrication of the rolling bearing because of the insufficient addition amount thereof. Even if a solid lubricant is incorporated in an amount exceeding 40% by weight, not only a further improvement in wear resistance or in the lubrication of the rolling bearing cannot be expected, but also there are cases where the cage itself has a reduced mechanical strength and suffers enhanced wear, resulting in an increase in the number of particles flying off the rolling bearing.

The fibrous filler used in the present invention is not particularly limited. Examples thereof include aluminum borate whiskers, potassium titanate whiskers, aramid fibers, aromatic polyimide fibers, liquid-crystal polyester fibers, calcium carbonate whiskers, graphite whiskers, magnesium oxysulfate whiskers, glass fibers, carbon fibers, metallic fibers, silicon carbide fibers, alumina fibers, boron fibers, silicon carbide whiskers, silicon nitride whiskers, alumina whiskers, aluminum nitride whiskers, wollastonite, zinc oxide whiskers, magnesium oxide whiskers, and mullite whiskers.

The fibers have a shape having an aspect ratio of from 3 to 200. This is because fibers having an aspect ratio of lower than 3 have an insufficient cage-reinforcing effect to give a brittle cage, while fibers having an aspect ratio exceeding about 200 are extremely difficult to disperse evenly during mixing. Although the fibers are not particularly limited in fiber diameter, those having an average fiber diameter of from 0.2 to 30 $\mu$m are preferred. More preferred are those having an average fiber diameter of from 0.3 to 5 $\mu$m. The reasons are as follows. If thin fibers having an average fiber diameter of smaller than 0.2 $\mu$m are used, fiber aggregation occurs during mixing with a base material, resulting in uneven fiber dispersion. On the other hand, if thick fibers having an average fiber diameter exceeding 30 $\mu$m are used, there are cases where the resultant cage not only has impaired surface smoothness but also causes damage to the sliding surfaces of mating members and to the lubricating film made of a solid lubricant deposited on the base metals. Lubricating-film debris which have fallen off the damaged lubricating film may be caught in contact areas between the rolling elements and the inner or outer ring and crushed by wearing into many fine particles, resulting in a considerable increase in the number of particles flying off the rolling bearing. When fibers having an average fiber diameter of from 0.3 to 5 $\mu$m are used, there is no such tendency and satisfactory results are obtained.

Although the content of the fibrous filler described above in the whole resin composition is not particularly limited, it is preferably from 5 to 40% by weight. The reasons for this are as follows. If the content thereof is lower than 5% by weight, almost no improvement is observed in the mechanical strength of the resultant cage. On the other hand, even if a fibrous filler is incorporated in an amount exceeding 40% by weight, not only a further improvement in mechanical strength cannot be expected, but also there are cases where the composition has considerably reduced melt flowability and impaired moldability, resulting in a cage-constituting material having a reduced lubricant content and hence insufficient lubricity.

The total content of the solid lubricant and the fibrous filler in the whole resin composition is not particularly limited. However, it is preferably from 10 to 60% by weight based on the resin composition. This is because if the solid lubricant and the fibrous filler are incorporated in a total amount exceeding 60% by weight, melt moldability is considerably impaired even when the addition amount of each ingredient is not larger than 40% by weight. The fibrous filler can be treated with a coupling agent (e.g., a silane coupling agent or titanate coupling agent), in order to enhance compatibility between the melt-moldable fluororesin and the filler to thereby improve the filler/resin adhesion and the dispersibility of the filler. The filler may be treated with other surface-treating agents according to purposes. Surface-treating agents usable for the present invention are not limited to these.

Various additives may be incorporated as long as the incorporation thereof does not impair the object of the present invention. Examples thereof include antioxidants, heat stabilizers, ultraviolet absorbers, protective agents against light, flame retardants, antistatic agents, flowability improvers, adherents, crystallization accelerators, nucleating agents, pigments, and dyes.

Methods for mixing the melt-moldable fluororesin with the solid lubricant, the fibrous filler, and other various additives are not particularly limited. For example, the fluororesin can be melt-kneaded and mixed with those ingredients successively. It is also possible to premix all those ingredients by means of a mixer such as, e.g., a Henschel mixer, tumbler, ribbon mixer, or ball mill and feed the resultant mixture to a melting mixer. A well-known melting mixer can be used, such as a single- or twin-screw extruder, mixing rolls, pressure kneader, Banbury mixer, or Bravender Plastograph. Temperatures at which the melt kneading is conducted are not particularly limited, and an appropriate temperature may be selected from the temperature range in which the melt-moldable fluororesin melts sufficiently but does not decompose.

Processes for producing the cage to be integrated into the rolling bearing of the present invention are not particularly limited. For example, ordinary techniques such as injection molding, compression molding, and transfer molding can be used for molding the cage. Among these molding techniques, injection molding is preferred because it has excellent productivity and is capable of providing inexpensive cages.

The solid lubricating film which may be formed on part or all of the surfaces of the raceway grooves and the rolling elements in the rolling bearing of the present invention is not particularly limited as long as the film comprises at least one member selected from the group consisting of graphite, graphite fluoride, hexagonal boron nitride, tetrafluoroethylene resins, silver, lead, molybdenum disulfide, and tungsten disulfide.

Methods for forming the film are not particularly limited. For example, well-known film-forming techniques can be used, such as baking, thermal spraying, sputtering, ion plating, vapor deposition, electroplating, and electroless plating. Although the thickness of the film is not particularly limited, it is desirably from 0.1 to 20 $\mu$m. The reasons are as follows. If the film formed beforehand has a thickness of smaller than 0.1 $\mu$m, there are cases where the film wears and disappears before a component of the cage is released therefrom and deposits on the surfaces of the rolling elements, inner ring, and outer ring to form a solid lubricating film thereon, resulting in direct contact between the base metals and in a rapid increase in bearing torque to cause baking. If the film formed beforehand has a thickness of larger than 20 $\mu$m, there are cases where not only the film readily peels off the base metals due to the residual stress caused inside the film during film formation, resulting in no lubricating effect, bat also film debris which have separated from the base metals are caught in contact areas between the rolling elements and the inner or outer ring and crushed into many fine particles, resulting in a considerable increase in the number of particles flying off the rolling bearing. In addition, forming a film having a thickness of larger than 20 $\mu$m beforehand is disadvantageous in that since the film itself serves to support load, the film surface may have a permanent deformation to make the rolling bearing work unsmoothly, and that the rigidity of the rolling bearing itself may be reduced as a result of the reduced rigidity of the contact areas.

The material of each of the inner ring, outer ring, and rolling elements in the rolling bearing of the present invention is not particularly limited. Examples thereof include metallic materials such as bearing steel and stainless steel and ceramic materials such as silicon nitride ($Si_3N_4$), silicon carbide (SiC), Sialon, partially stabilized zirconia ($ZrO_2$), and alumina ($Al_2O_3$).

Embodiments of the present invention will be explained below by reference to the drawings.

Figure 1:
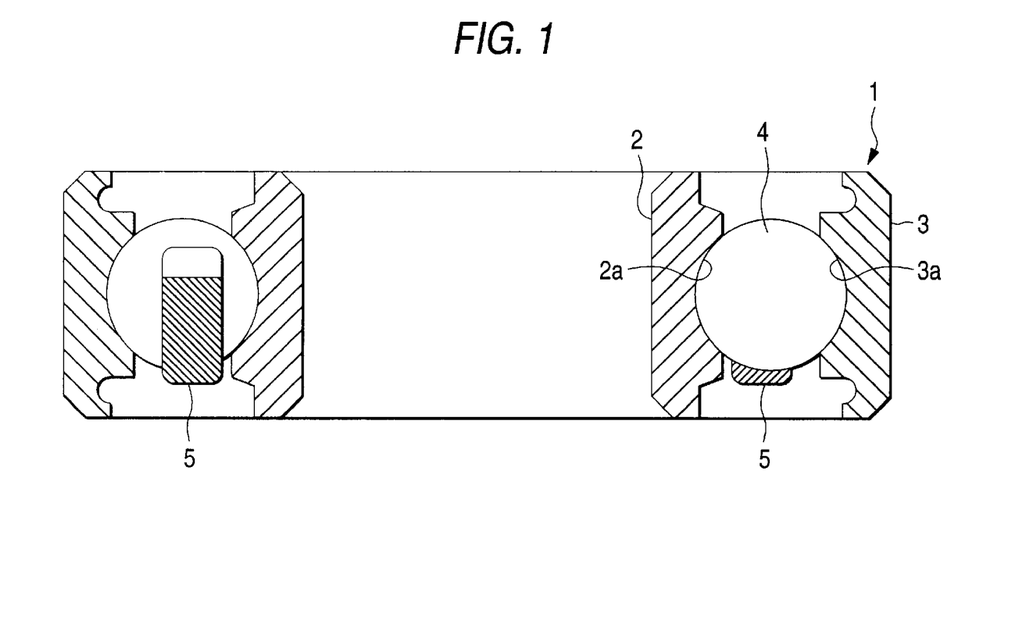
FIG. 1 is a vertical sectional view illustrating the constitution of a rolling bearing apparatus according to an embodiment of the present invention.
Figure 2:
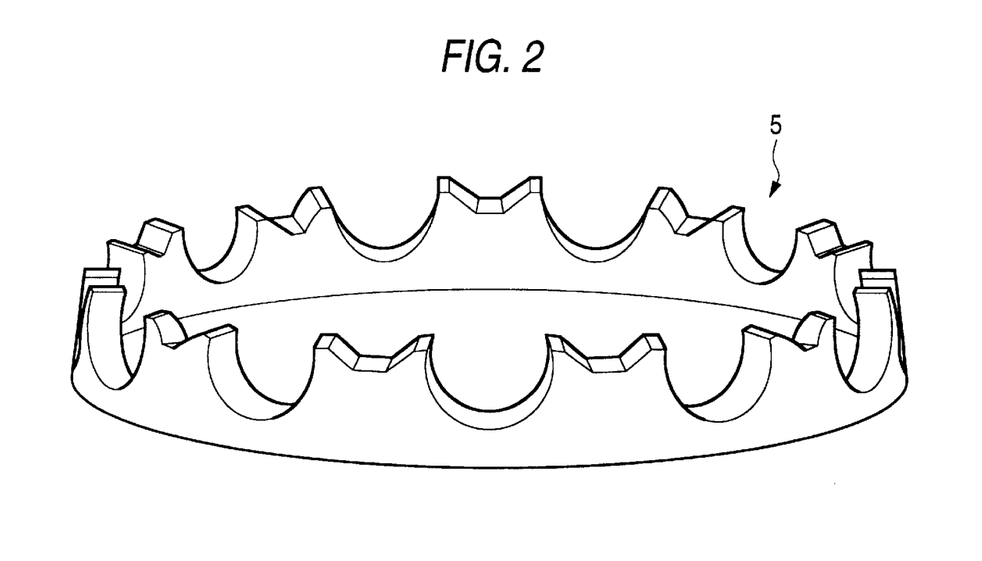
FIG. 2 is a perspective view illustrating the constitution of the cage of the rolling bearing apparatus.

FIG. 1 is a vertical sectional view illustrating the constitution of a rolling bearing according to the present invention. In FIG. 1, numeral 1 denotes the rolling bearing, which comprises an inner ring 2, an outer ring 3, rolling elements 4, and a cage 5. The inner ring 2 has an inner ring raceway groove 2a on its outer periphery, while the outer ring 3 has an outer ring raceway groove 3a on its inner periphery. The rolling elements 4 each is a sphere and has been interposed freely rollably between the inner ring raceway groove 2a and the outer ring raceway groove 3a. The cage 5 has a crown-like shape as shown in FIG. 2, and has been disposed freely rotatably between the inner ring raceway groove 2a and the outer ring raceway groove 3a so as to guide and hold the rolling elements 4.

The inner ring 2, outer ring 3, and rolling elements 4 each is made of stainless steel, SUS440C.

The cage 5, which is a main factor of the present invention, is made of a resin composition comprising a melt-moldable fluororesin as the main component and further comprising at least one solid lubricant having an average particle diameter of from 0.1 to 60 $\mu$m and a fibrous filler having an aspect ratio of from 3 to 200.

The starting materials for the cages used in embodiments of the present invention and in comparative examples are summarized below.

(1) PFA (manufactured by Daikin Kogyo Co., Ltd.; Neoflon PFA AP-201)
(2) ETFE (manufactured by Daikin Kogyo Co., Ltd.; Neoflon ETFE EP-520)

(3) PPS/poly(phenylene sulfide) resin (manufactured by Phillips Petroleum Co., Ltd. Ryton R-6)
(4) Graphite (manufactured by Chuetsu Kokuen Kogyo K. K.; CLX; average particle diameter, 4.5 μm)
(5) Fluoromica A (manufactured by Topy Industries, Ltd.; synthetic mica PDM-800; average particle diameter, 10 μm)
(6) Fluoromica B (manufactured by Topy Industries, Ltd.; synthetic mica PDM-9WA; average particle diameter, 8 μm)
(7) PTFE (manufactured by Daikin Kogyo Co., Ltd.; Lublon L-5; average particle diameter, 0.2 μm)

manner in order to prevent a fibrous filler from breaking. Various materials excluding a fibrous filler were dry-blended by means of a Henschel mixer. This mixture was kneaded with a twin-screw extruder while adding the fibrous filler thereto with a constant-delivery side feeder, and then extruded and pelletized. The pellets thus obtained were fed to an injection molding machine and molded into a desired cage shape (cage corresponding to Type No. 608). This shape of the cage 5 was the crown-like shape shown in FIG. 2.

The proportions (wt %) of the materials in each embodiment are shown in Table 1.

TABLE 1

| Constituent Material | Example 1 | 2 | 3 | 4 | 5 | 6 | 7 | 8 | 9 | 10 | 11 | 12 | 13 | 14 | 15 | 16 | 17 | 18 | 19 | 20 | 21 | 22 | Comparative Example 1 | 2 | 3 | 4 |
|---|---|---|---|---|---|---|---|---|---|---|---|---|---|---|---|---|---|---|---|---|---|---|---|---|---|---|
| Cage Resin | | | | | | | | | | | | | | | | | | | | | | | | | | |
| PFA | 60 | 60 | 60 | 60 | 60 | | 60 | 60 | 60 | 60 | | | | | | | | | | | | | 100 | 70 | 70 | |
| ETFE | | | | | | 60 | | | | | 70 | 70 | 70 | 60 | 70 | 60 | 70 | 60 | 70 | 60 | 70 | 70 | | | | |
| PPS | | | | | | | | | | | | | | | | | | | | | | | | | | 60 |
| Solid lubricant | | | | | | | | | | | | | | | | | | | | | | | | | | |
| Graphite | 20 | 20 | | | 20 | 20 | | 10 | 10 | | 10 | | | | | | | | | | | | | | 20 | |
| Fluoromica A | | | 20 | | 10 | | | | | 10 | | | | | | | | | | | | | | | | |
| Fluoromica B | | | | | | | | | | | 20 | | | | | | | | | | | | | | | |
| hBN | | | | | | | | | 10 | | | | | | | | | | | | | | | | | |
| PTFE | | | | 20 | 10 | | | | | | | 20 | | | 10 | 20 | 10 | 20 | | 20 | | | | 30 | | |
| MCA | | | | | | | | | | | | | 20 | 20 | | 10 | 10 | | | | 10 | | | | | |
| Amino acid compound | | | | | | | | | | | | | | 20 | 20 | | 10 | 10 | 10 | | | | | | | |
| Silver | | | | | | | | | | 10 | | | | | | | | | | | | | | | | |
| WS | | | | | | | | 10 | | | | | | | | | | | | | | | | | | |
| Carbon fiber | 20 | | | | | | | | | | | | | | | | | | | | | | | | | |
| Fiber | | | | | | | | | | | | | | | | | | | | | | | | | | |
| Potassium titanate whisker | | 20 | 20 | 20 | 20 | 20 | 20 | 20 | 20 | 20 | 20 | 10 | 10 | 10 | 20 | 10 | 20 | 10 | 10 | 10 | 10 | | | | | |
| Aluminum borate whisker | | | | | | | | | | | | | | | | | | | | | | 10 | | | 30 | 20 |
| Film | | | | | | | | | | | | | | | | | | | | | | | | | | |
| Silver film | | | | | | | | | present | | | | | | | | | | | | | | | | | |

(Numerals show proportions by weight (wt%))

(8) MCA (manufactured by Mitsubishi Chemical Corp.; melamine cyanurate; average particle diameter, 2 μm)
(9) Amino acid compound (manufactured by Ajinomoto Co., Inc.; Famex L-12J; average particle diameter, 2 μm)
(10) Carbon fibers (manufactured by Kureha Chemical Industry Co., Ltd.; Kreca Chop M-102S; fiber diameter, 14.5 μm; fiber length, 0.2 mm)
(11) Potassium titanate whiskers (manufactured by Otsuka Chemical Co., Ltd.; Tismo D-101; diameter, 0.3–0.6 μm; length, 10–20 μm)
(12) Aluminum borate whiskers (manufactured by Shikoku Chemicals Corp.; Alubolex YSI; diameter, 0.5–1.0 μm; length, 10–30 μm)

The cage 5 integrated into a test bearing according to each embodiment described below was produced in the following A 1st embodiment employed a cage consisting of 60 wt % of PFA as a melt-moldable fluororesin of the main component, 20 wt % of graphite as a solid lubricant, and 20 wt % of carbon fibers as a fibrous filler.

A 2nd embodiment employed a cage consisting of 60 wt % of PFA as a melt-moldable fluororesin of the main component, 20 wt % of graphite as a solid lubricant, and 20 wt % of potassium titanate whiskers as a fibrous filler.

A 3rd embodiment employed a cage consisting of 60 wt % of PFA as a melt-moldable fluororesin of the main component, 20 wt % of fluoromica as a solid lubricant, and 20 wt % of potassium titanate whiskers as a fibrous filler.

A 4th embodiment employed a cage consisting of 60 wt % of PFA as a melt-moldable fluororesin of the main component, 20 wt % of PTFE as a solid lubricant, and 20 wt % of potassium titaneite whiskers as El fibrous filler.

A 5th embodiment employed a cage consisting of 60 wt % of PFA as a melt-moldable fluororesin of the main component, 10 wt % of fluoromica and 10 wt % of PTFE as solid lubricants, and 20 wt % of potassium titanate whiskers as a fibrous filler.

A 6th embodiment employed a cage consisting of 60 wt % of ETFE as a melt-moldable fluororesin of the main component, 20 wt % of graphite as a solid lubricant, and 20 wt % of potassium titanate whiskers as a fibrous filler.

A 7th embodiment employed a cage consisting of 60 wt % of PFA as a melt-moldable fluororesin of the main component, 20 wt % of graphite as a solid lubricant, and 20 wt % of potassium titanate whiskers as a fibrous filler. In this embodiment, a silver film having a thickness of 0.2 μm was formed by ion plating on the surfaces of the inner ring raceway groove 2a and outer ring raceway groove 3a.

An 8th embodiment employed a cage consisting of 60 wt % of PFA as a melt-moldable fluororesin of the main component, 10 wt % of graphite and 10 wt % of $WS_2$ as solid lubricants, and 20 wt % of potassium titanate whiskers as a fibrous filler.

A 9th embodiment employed a cage consisting of 60 wt % PFA as a melt-moldable fluororesin of the main component, 10 wt % of graphite and 10 wt % of hBN as solid lubricants, and 20 wt % of potassium titanate whiskers as a fibrous filler.

A 10th embodiment employed a cage consisting of 60 wt % of PFA as a melt-moldable fluororesin of the main component, 10 wt % of fluoromica and 10 wt % of silver as solid lubricants, and 20 wt % of potassium titanate whiskers as a fibrous filler.

An 11th embodiment employed a cage consisting of 70 wt % of ETFE as a melt-moldable fluororesin of the main component, 20 wt % of fluoromica B as a solid lubricant, and 10 wt % of potassium titanate whiskers as a fibrous filler.

A 12th embodiment employed a cage consisting of 70 wt % of ETFE as a melt-moldable fluororesin of the main component, 20 wt % of PTFE as a solid lubricant, and 10 wt % of potassium titanate whiskers as a fibrous filler.

A 13th embodiment employed a cage consisting of 70 wt % of ETFE as a melt-moldable fluororesin of the main component, 20 wt % of MCA as a solid lubricant, and 10 wt % of potassium titanate whiskers as a fibrous filler.

A 14th embodiment employed a cage consisting of 60 wt % of ETFE as a melt-moldable fluororesin of the main component, 20 wt % of MCA as a solid lubricant, and 20 wt % of potassium titanate whiskers as a fibrous filler.

A 15th embodiment employed a cage consisting of 70 wt % of ETFE as a melt-moldable fluororesin of the main component, 20 wt % of amino acid compound as a solid lubricant, and 10 wt % of potassium titanate whiskers as a fibrous filler.

A 16th embodiment employed a cage consisting of 60 wt % of ETFE as a melt-moldable fluororesin of the main component, 20 wt % of amino acid compound as a solid lubricant, and 20 wt % of potassium titanate whiskers as a fibrous filler.

A 17th embodiment employed a cage consisting of 70 wt % of ETFE as a melt-moldable fluororesin of the main component, 10 wt % of PTFE and 10 wt % of MCA as solid lubricants, and 10 wt % potassium titanate whiskers as a fibrous filler.

An 18th embodiment employed a cage consisting of 60 wt % of ETFE as a melt-moldable fluororesin of the main component, 20 wt % of :PTFE and 10 wt % of MCA as solid lubricants, and 10 wt % of potassium titanate whiskers as a fibrous filler.

A 19th embodiment employed a cage consisting of 60 wt % of ETFE as a melt-moldable fluororesin of the main component, 10 wt % of PTFE and 10 wt % of amino acid compound as solid lubricants, and 10 wt % of potassium titanate whiskers as a fibrous filler.

A 20th embodiment employed a cage consisting of 60 wt % of ETFE as a melt-moldable fluororesin of the main component, 20 wt % of PTFE and 10 wt % of amino acid compound as solid lubricants, and 10 wt % of potassium titanate whiskers as a fibrous filler.

A 21st embodiment employed a cage consisting of 70 wt % of ETFE as a melt-moldable fluororesin as the main component, 10 wt % of MCA and 10 wt % of amino acid compound as solid lubricants, and 10 wt % of potassium titanate whiskers as a fibrous filler.

A 22nd embodiment employed a cage consisting of 70 wt % of ETFE as a melt-moldable fluororesin serving as the main component, 20 wt % of PTFE as a solid lubricant, and 10 wt % of aluminum borate whiskers as a fibrous filler.

A 1st comparative example employed a cage consisting of 100 wt % of PFA as a melt-moldable fluororesin of the main component.

A 2nd comparative example employed a cage consisting of 70 wt % of PFA as a melt-moldable fluororesin of the main component and 30 wt % of PTFE as a solid lubricant.

A 3rd comparative example employed a cage consisting of 70 wt % of PFA as a melt-moldable fluororesin of the main component and 30 wt % of potassium titanate whiskers as a fibrous filler.

A 4th comparative example employed a cage consisting of 60 wt % of PPS as ore corresponding to a melt-moldable fluororesin of the main component, 20 wt % of graphite as a solid lubricant, and 20 wt % of potassium titanate whiskers as a fibrous filler.

Rolling bearings respectively containing, integrated thereinto, the cages according to the embodiments and comparative examples described above were subjected to a rotation test using a bearing rotation tester manufactured by NSK Ltd., under the following conditions to evaluate the bearings for torque stability and torque life.

Conditions for the rotation test and evaluation are as follows.
(1) Test bearing: ball bearing corresponding to Type No. 608 (inner diameter, 8 mm; outer diameter, 22 mm; width, 7 mm)
(2) Ambient pressure: $1 \times 10^{-4}$ Pa
(3) Ambient temperature: 200° C., 250° C.
(4) Axial load: 19.6 N
(5) Radial load: 1.96 N
(6) Rotational speed: 1,000 rpm Torque was measured with a bearing torque meter.

Each test bearing was rotated at 1,000 rpm, and the torque thereof was measured with a strain gauge and recorded with a recorder. The torque stability was evaluated based on the ratio of the initial value of torque as measured in the initial stage of the rotation to the value as measured at the time when the torque had become almost constant after the lapse of 10 minutes from the initiation of rotation (stationary value).

In determining torque life, the test was stopped when the torque had reached a value 3 times the stationary value. The total number of revolutions which had been counted before the stoppage was taken as the torque life. The torque stability was given in terms of the quotient obtained by dividing the initial value by the stationary value.

Figure 3:
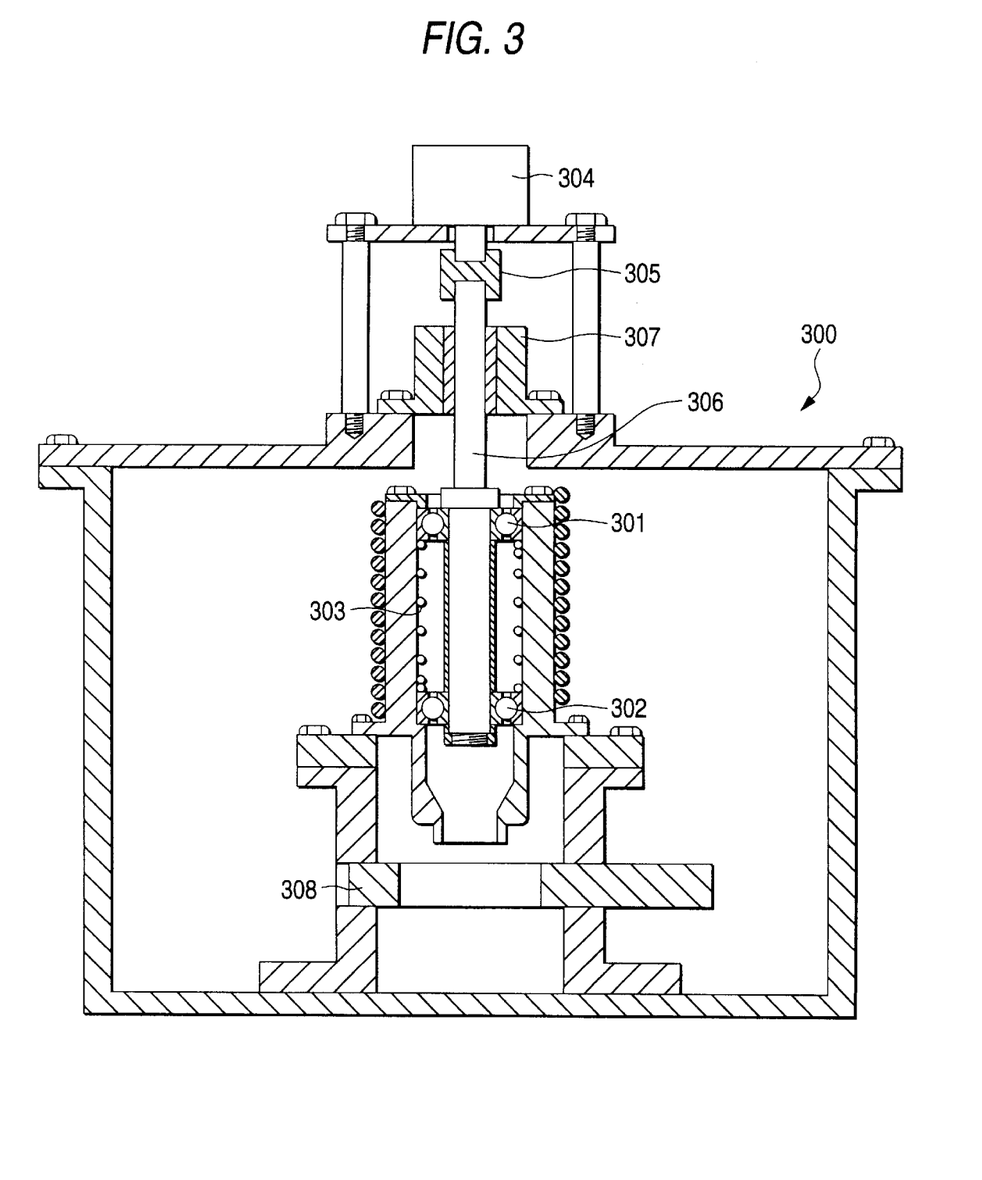
FIG. 3 is a vertical sectional view illustrating the constitution of a vacuum bearing dusting test apparatus used in the present invention.

FIG. 3 is a schematic view of a vacuum bearing dusting test apparatus used in the present invention for examining the amount of dusting. In this figure, numeral 300 denotes the vacuum bearing dusting test apparatus, which is installed in a vacuum chamber. Test bearings 301 and 302 are rotated with a motor 104 through a coupling 305, a shaft 306, and a rotation introducer 307 having a magnetic fluid seal, while an axial load is kept being applied thereto with a coil spring 303.

The number of particles flying off the test bearings 301 and 302 (the amount of dusting) was counted with a laser light scattering particle counter 308.

The test conditions are as follows.
(1) Test bearing: ball bearing corresponding to Type No. 608 (inner diameter, 8 mm; outer diameter, 22 mm; width, 7 mm)
(2) Ambient pressure: $1 \times 10^{-4}$ Pa
(3) Ambient temperature: 200° C., 250° C.
(4) Axial load: 19.6 N
(5) Rotational speed: 1,000 rpm The results of the above tests for examining torque stability, torque life, and dusting amount are shown in Table 2.

TABLE 2

|  |  | 200° C. | | | 250° C. | | |
|---|---|---|---|---|---|---|---|
|  |  | Torque stability | Torque life | Dusting amount | Torque stability | Torque life | Dusting amount |
| Example | 1 | 1.5 | $5.1 \times 10^8$ | ≦20 | 1.6 | $4.0 \times 10^7$ | ≦10 |
|  | 2 | 1.4 | $5.7 \times 10^8$ | ≦10 | 1.5 | $4.5 \times 10^7$ | ≦10 |
|  | 3 | 1.3 | $6.9 \times 10^8$ | ≦10 | 1.3 | $7.0 \times 10^7$ | ≦10 |
|  | 4 | 1.4 | $6.7 \times 10^8$ | ≦10 | 1.7 | $2.1 \times 10^7$ | ≦10 |
|  | 5 | 1.3 | $7.3 \times 10^8$ | ≦10 | 1.5 | $3.4 \times 10^7$ | ≦10 |
|  | 6 | 1.5 | $1.1 \times 10^8$ | ≦20 | 1.5 | $4.1 \times 10^5$ | ≦10 |
|  | 7 | 1.1 | $9.2 \times 10^8$ | ≦10 | 1.2 | $9.6 \times 10^7$ | ≦10 |
|  | 8 | 1.2 | $7.5 \times 10^8$ | ≦10 | 1.3 | $3.8 \times 10^7$ | ≦10 |
|  | 9 | 1.2 | $7.8 \times 10^8$ | ≦10 | 1.3 | $4.2 \times 10^7$ | ≦10 |
|  | 10 | 1.2 | $7.6 \times 10^8$ | ≦10 | 1.3 | $4.3 \times 10^7$ | ≦10 |
|  | 11 | 1.4 | $2.0 \times 10^8$ | ≦20 | 1.4 | $5.0 \times 10^5$ | ≦10 |
|  | 12 | 1.3 | $5.0 \times 10^8$ | ≦20 | 1.5 | $4.5 \times 10^7$ | ≦10 |
|  | 13 | 1.3 | $4.0 \times 10^8$ | ≦20 | 1.3 | $7.5 \times 10^5$ | ≦10 |
|  | 14 | 1.4 | $3.8 \times 10^8$ | ≦20 | 1.4 | $7.3 \times 10^5$ | ≦10 |
|  | 15 | 1.3 | $3.5 \times 10^8$ | ≦20 | 1.3 | $3.0 \times 10^5$ | ≦10 |
|  | 16 | 1.4 | $3.7 \times 10^8$ | ≦20 | 1.4 | $3.2 \times 10^5$ | ≦10 |
|  | 17 | 1.3 | $4.6 \times 10^8$ | ≦20 | 1.3 | $8.0 \times 10^5$ | ≦10 |
|  | 18 | 1.3 | $4.8 \times 10^8$ | ≦20 | 1.3 | $8.3 \times 10^5$ | ≦10 |
|  | 19 | 1.4 | $4.0 \times 10^8$ | ≦20 | 1.4 | $3.8 \times 10^5$ | ≦10 |
|  | 20 | 1.3 | $4.3 \times 10^8$ | ≦20 | 1.3 | $5.5 \times 10^5$ | ≦10 |
|  | 21 | 1.4 | $3.8 \times 10^8$ | ≦20 | 1.4 | $4.5 \times 10^5$ | ≦10 |
|  | 22 | 1.3 | $5.5 \times 10^8$ | ≦20 | 1.4 | $8.8 \times 10^5$ | ≦10 |
| Comparative Example | 1 | 2.2 | $5.2 \times 10^5$ | 100 | 2.0 | $6.7 \times 10^4$ | 200 |
|  | 2 | 1.9 | $3.3 \times 10^6$ | 50 | 1.8 | $4.3 \times 10^4$ | 80 |
|  | 3 | 2.1 | $6.0 \times 10^5$ | 80 | 2.2 | $5.5 \times 10^4$ | 150 |
|  | 4 | 2.0 | $9.2 \times 10^5$ | 500 | 2.1 | $2.2 \times 10^4$ | 1000 |

In Table 2, each value of the dusting amount is given as a relative value, with the dusting amount for the first comparative example at 200° C. being taken as 100.

Figure 4:
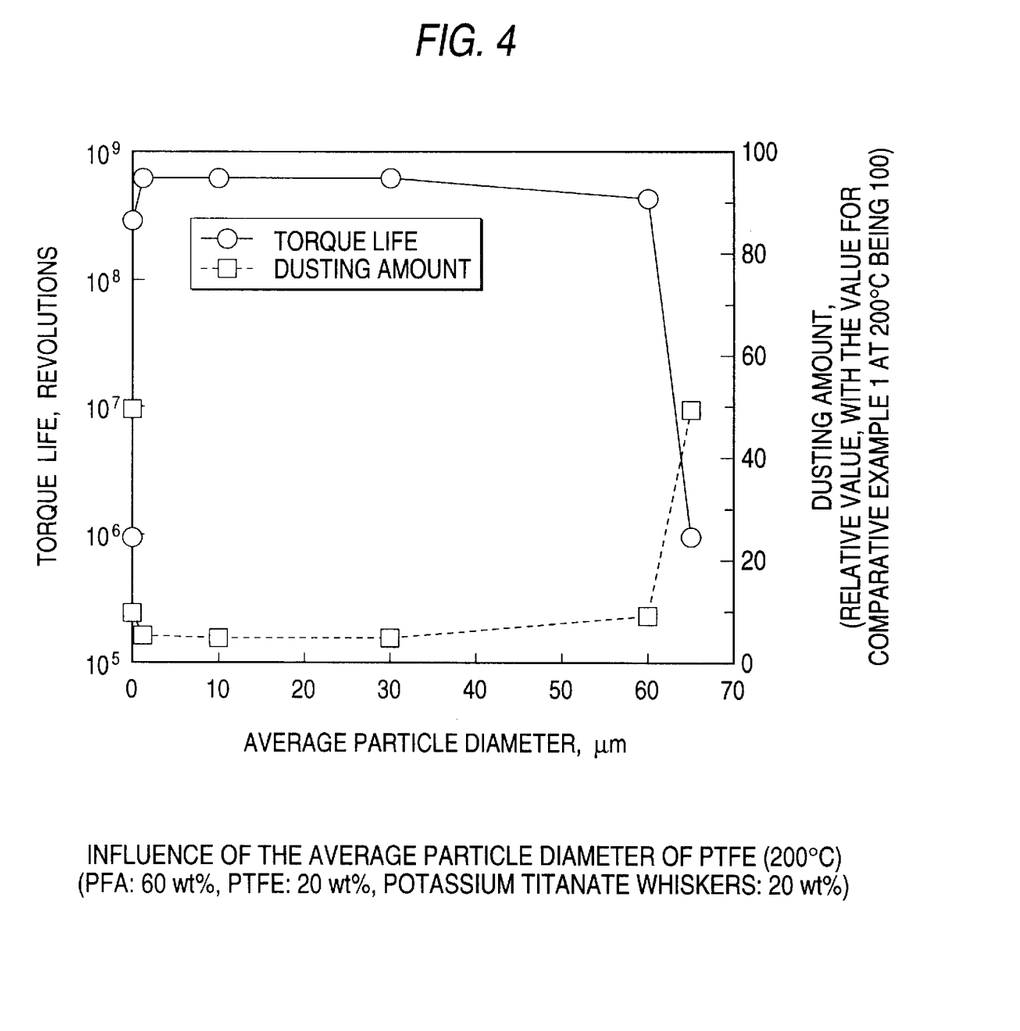
FIG. 4 is a graph showing the relationship between the average particle diameter of a PTFE powder and each of torque life and the amount of dusting.
Figure 5:
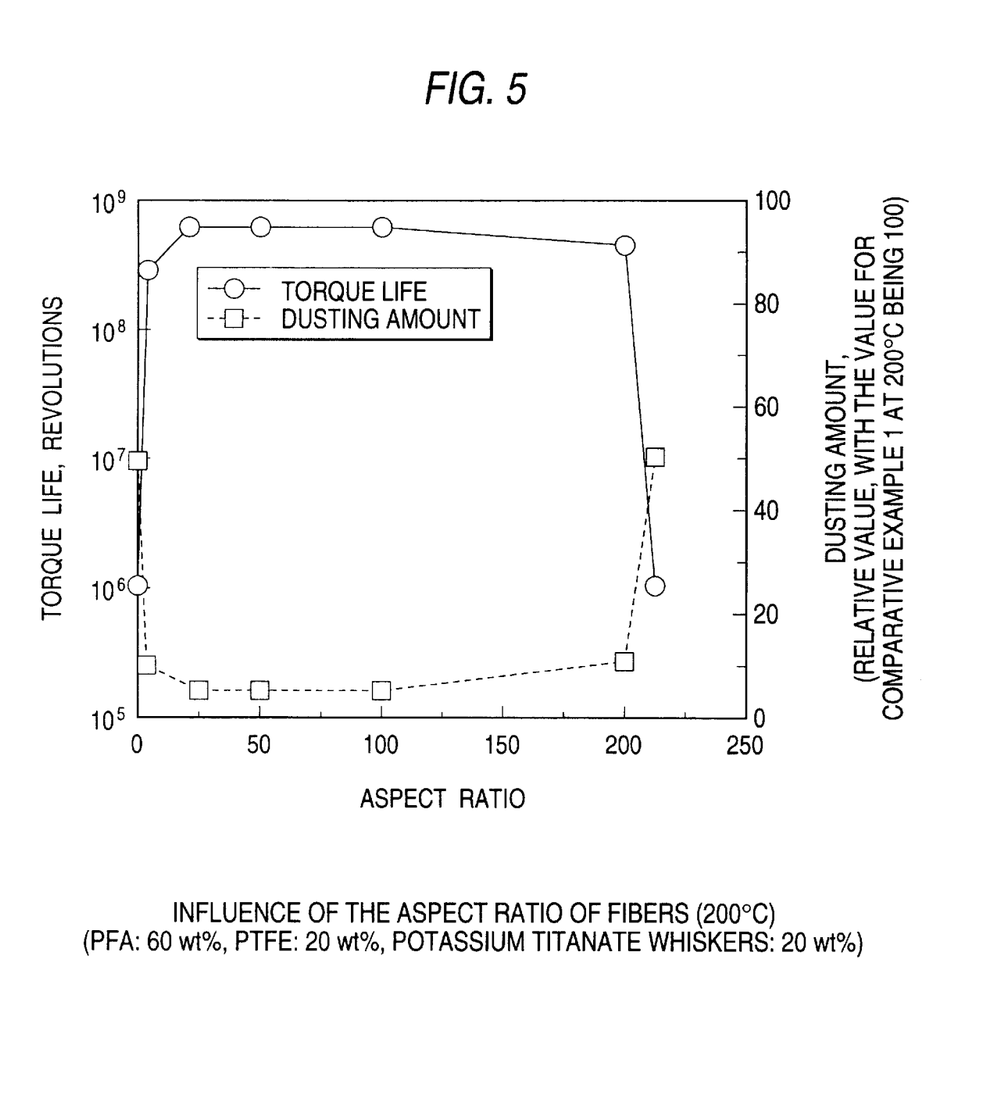
FIG. 5 is a graph showing the relationship between the aspect ratio of potassium titanate whiskers and each of torque life and the amount of dusting.

In the case of compositions consisting of a PFA/PTFE powder/potassium titanate whisker mixture, the influence of various average particle diameters of the PTFE powder and that of various aspect ratios of the potassium titanate whiskers on both torque life and dusting amount at 200° C. are shown in FIGS. 4 and 5, respectively.

FIG. 4 is a graph showing the relationship between the average particle diameter of the PTFE powder and each of torque life and dusting amount. In this figure, the torque life is plotted as one of the ordinate axes, the dusting amount as the other ordinate axis, and the average particle diameter as the transverse axis. The solid line indicates the torque life, while the broken line indicates the dusting amount.

FIG. 5 is a graph showing the relationship between the aspect ratio of the potassium titanate whiskers and each of torque life and dusting amount. In this figure, the torque life is plotted as one of the ordinate axes, the dusting amount as the other ordinate axis, and the aspect ratio as the transverse axis. The solid line indicates the torque life, while the broken line indicates the dusting amount.

Figure 6:
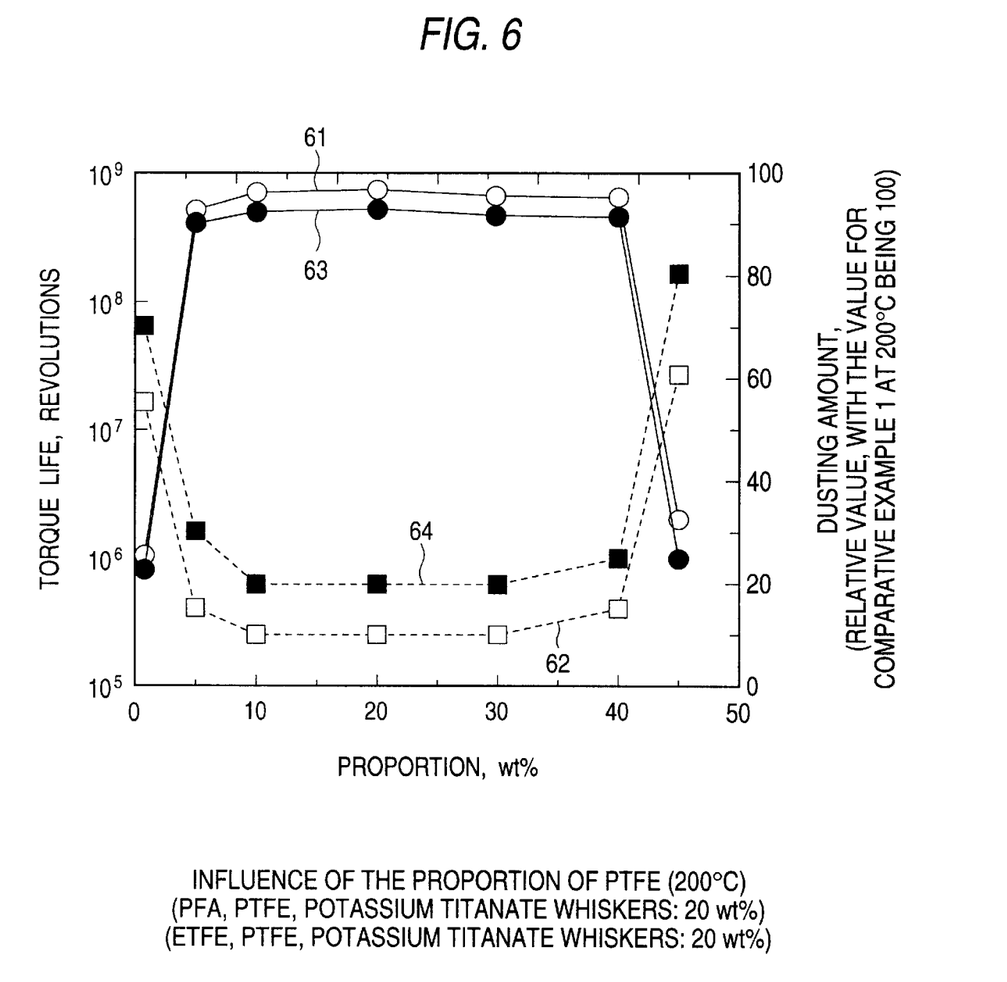
FIG. 6 is a graph showing the relationship between the proportion of a PRFE powder and each of torque life and the amount of dusting.

FIG. 6 is a graph showing the relationship between the proportion of the PTFE powder and each of torque life and dusting amount in the case of compositions consisting of a PFA/PTFE powder/potassium titanate whisker mixture or of compositions consisting of an ETFE/PTFE powder/potassium titanate whisker mixture. In this figure, curve 61 indicates the torque life in the case of the compositions consisting of a PFA/PTFE powder/potassium titanate whisker mixture; curve 62 indicates the dusting amount in the case of the compositions consisting of a PFA/PTFE powder/potassium titanate whisker mixture; curve 63 indicates the torque life in the case of the compositions consisting of an ETFE/PTFE powder/potassium titanate whisker mixture; and curve 64 indicates the dusting amount in the case of the compositions consisting of an ETFE/PTFE powder/potassium titanate whisker mixture.

Figure 7:
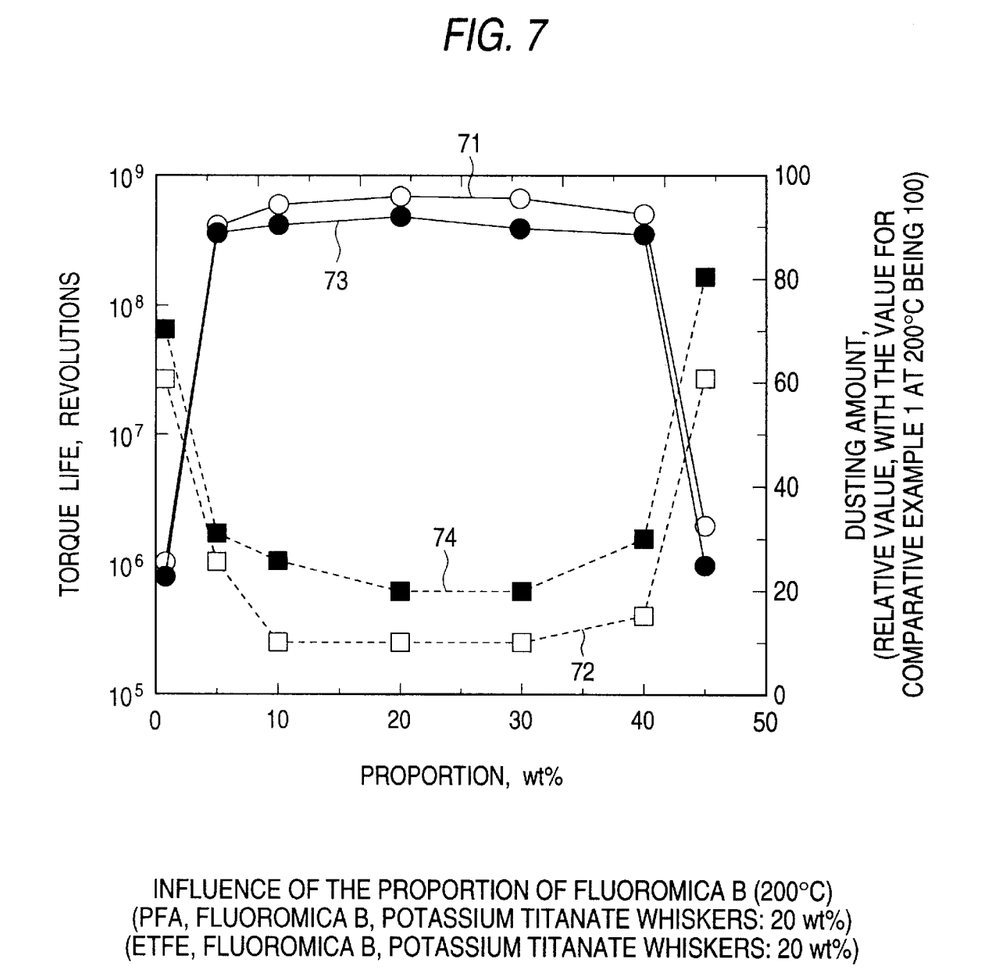
FIG. 7 is a graph showing the relationship between the proportion of fluoromica powder B and each of torque life and the amount of dusting.

FIG. 7 is a graph showing the relationship between the proportion of the fluoromica powder B and each of torque life and dusting amount in the case of compositions consisting of a PFA/fluoromica powder B/potassium titanate whisker mixture or of compositions consisting of an ETFE/fluoromica powder B/potassium titanate whisker mixture. In this figure, curve 71 indicates the torque life in the case of the compositions consisting of a PFA/fluoromica powder B/potassium titanate whisker mixture; curve 72 indicates the dusting amount in the case of the compositions consisting of a PFA/fluoromica powder B/potassium titanate whisker mixture; curve 73 indicates the torque life in the case of the compositions consisting of an ETFE/fluoromica powder B/potassium titanate whisker mixture; and curve 74 indicates the dusting amount in the case of the compositions consisting of an ETFE/fluoromica powder B/potassium titanate whisker mixture.

Figure 8:
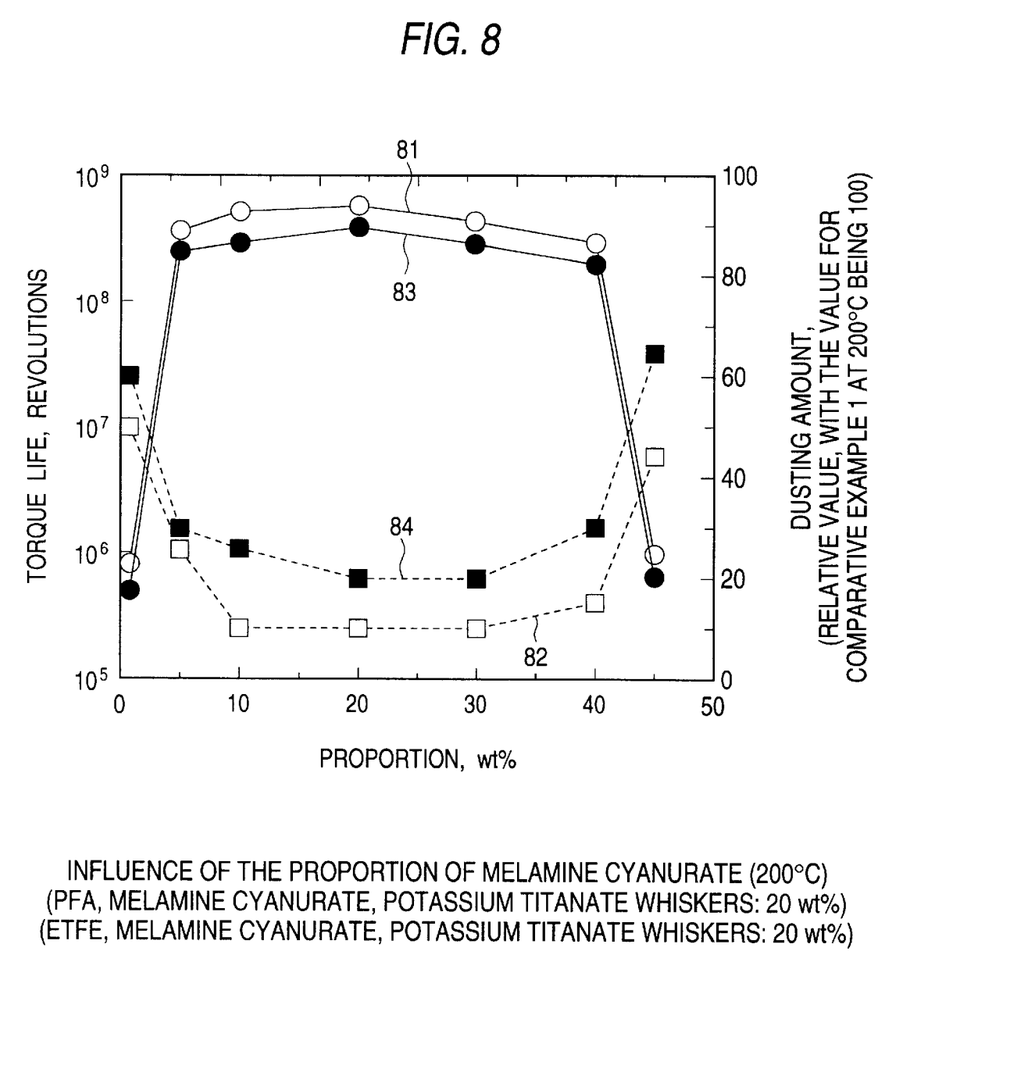
FIG. 8 is a graph showing the relationship between the proportion of a melamine cyanurate powder and each of torque life and the amount of dusting.

FIG. 8 is a graph showing the relationship between the proportion of the melamine cyanurate powder and each of torque life and dusting amount in the case of compositions consisting of a PFA/melamine cyanurate powder/potassium titanate whisker mixture or of compositions consisting of an ETFE/melamine cyanurate powder/potassium titanate whisker mixture. In this figure, curve 81 indicates the torque life in the case of the compositions consisting of a PFA/melamine cyanurate powder/potassium titanate whisker mixture; curve 82 indicates the dusting amount in the case of the compositions consisting of a PFA/melamine cyanurate powder/potassium titanate whisker mixture; curve 83 indicates the torque life in the case of the compositions consisting of an ETFE/melamine cyanurate powder/potassium titanate whisker mixture; and curve 84 indicates the dusting amount in the case of the compositions consisting of an ETFE/melamine cyanurate powder/potassium titanate whisker mixture.

Figure 9:
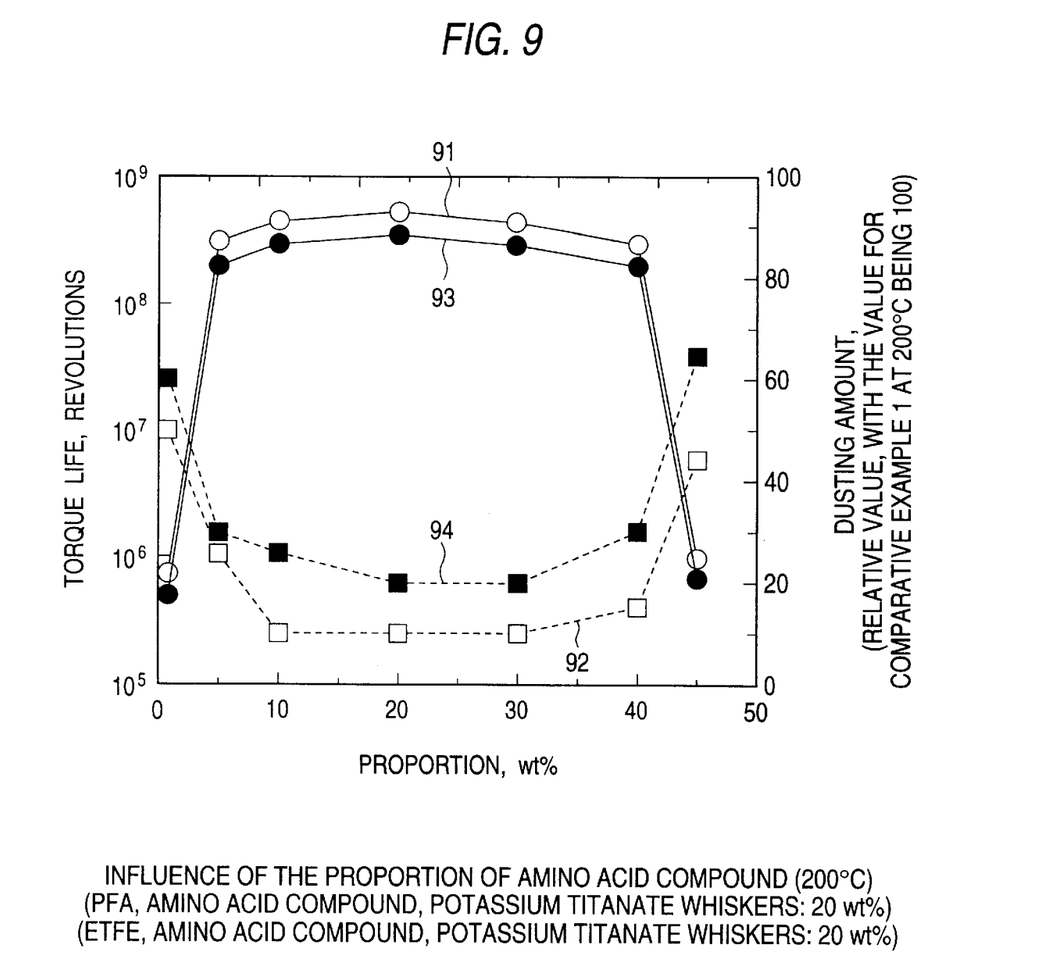
FIG. 9 is a graph showing the relationship between the proportion of an amino acid compound powder having a laminar crystal structure and each of torque life and the amount of dusting.

FIG. 9 is a graph showing the relationship between the proportion of the amino acid compound powder having a laminar crystal structure and each of torque life and dusting amount in the case of compositions consisting of a PFA/amino acid compound powder with laminar crystal structure/potassium titanate whisker mixture or of compositions consisting of an ETFE/amino acid compound powder with laminar crystal structure/potassium titanate whisker mixture. In this figure, curve 91 indicates the torque life in the case of the compositions consisting of a PFA/amino acid compound powder with laminar crystal structure/potassium titanate whisker mixture; curve 92 indicates the dusting amount in the case of the compositions consisting of a PFA/amino acid compound powder with laminar crystal structure/potassium titanate whisker mixture; curve 93 indicates the torque life in the case of the compositions consisting of an ETFE/amino acid compound powder with laminar crystal structure/potassium titanate whisker mixture; and curve 94 indicates the dusting amount in the case of the compositions consisting of an ETFE/amino acid compound powder with laminar crystal structure/potassium titanate whisker mixture.

Figure 10:
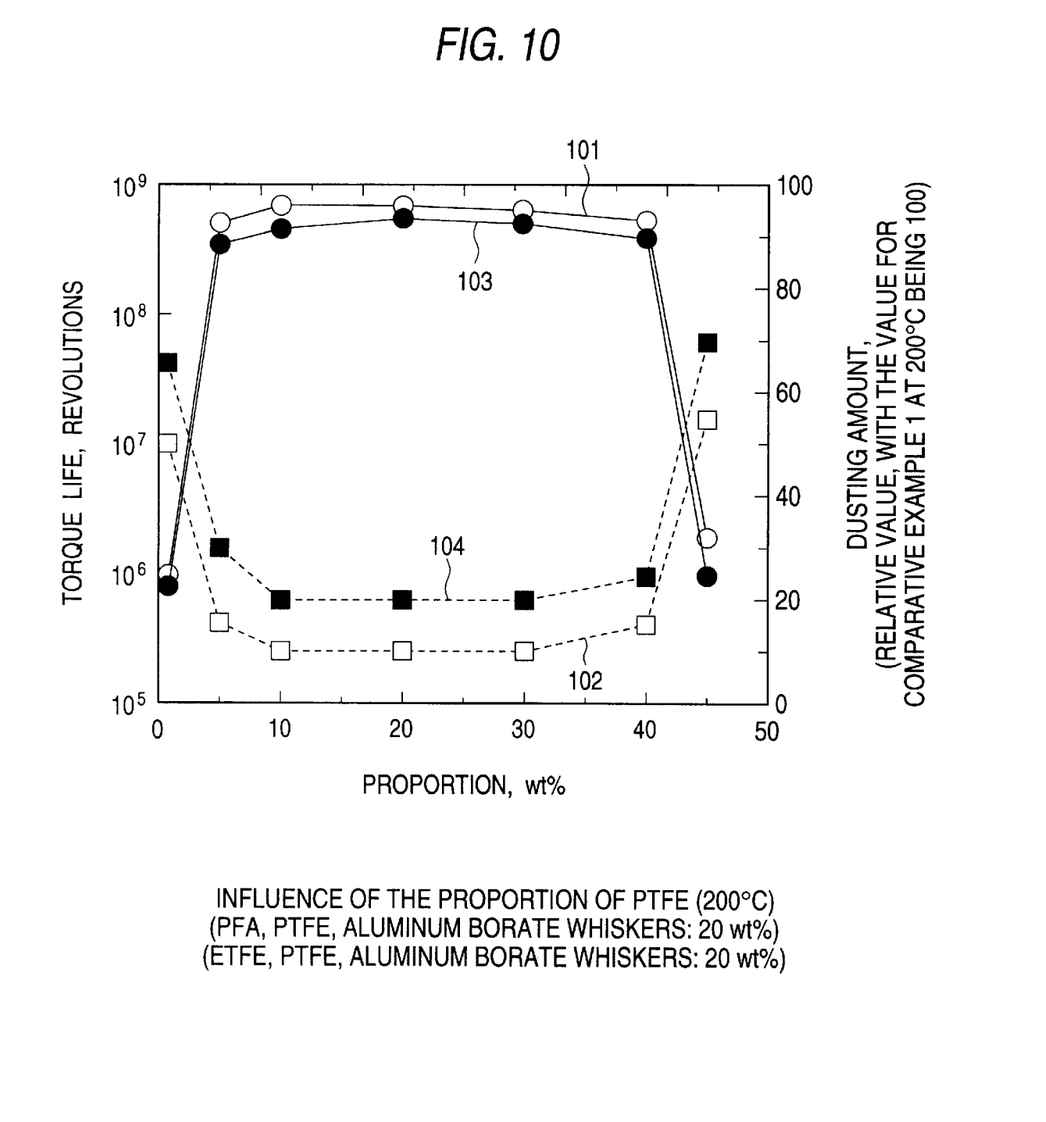
FIG. 10 is a graph showing the relationship between the proportion of a PTFE powder and each of torque life and the amount of dusting.

FIG. 10 is a graph showing the relationship between the proportion of the PTFE powder and each of torque life and dusting amount in the case of compositions consisting of a PFA/PTFE powder/aluminum borate whisker mixture or of compositions consisting of an ETFE/PTFE powder/aluminum borate whisker mixture. In this figure, curve 101 indicates the torque life in the case of the compositions consisting of a PFA/PTFE powder/aluminum borate whisker mixture; curve 102 indicates the dusting amount in the case of the compositions consisting of a PFA/PIPFE powder/aluminum borate whisker mixture; curve 103 indicates the torque life in the case of the compositions consisting of an ETFE/PTFE powder/aluminum borate whisker mixture; and curve 104 indicates the dusting amount in the case of the compositions consisting of an ETFE/PTFE powder/aluminum borate whisker mixture.

As is apparent from Table 2 and FIGS. 4 to 10, the rolling bearings respectively containing, integrated thereinto, cages according to the embodiments of the present invention have an extremely long torque life and are more reduced in the number of particles flying off the bearings (dusting amount) as compared with the rolling bearings respectively containing cages according to the comparative examples integrated thereinto, even in high-temperature environments having ambient temperatures of 200° C. and 250° C.

As described above in detail, the rolling bearing of the present invention is inexpensive and, in particular, is capable of maintaining a satisfactorily lubricated state over long even in high-temperature environments and reduced in the number of particles flying outward therefrom, because it employs a cage made of a resin composition comprising a melt-moldable fluorocarbon as the main component and further comprising at least one solid lubricant having an average particle diameter of from 0.1 to 60 µm and a fibrous filler having an aspect ratio of from 3 to 200. Consequently, the rolling bearing is less apt to contaminate the surrounding atmosphere and can smoothly work over long, in particular even at high temperatures. The present invention therefore produces an effect that the rolling bearing not only is suitable for use in applications requiring a clean atmosphere, such as apparatuses for producing semiconductors, liquid-crystal panels etc., but also is usable, without raising any difficulty, in a severe environment where a lubricating oil or grease is generally unusable, such as a high-temperature of vacuum atmosphere, a special atmosphere, an extreme-low-temperature atmosphere, etc.

While the invention has been described in detail and with reference to specific embodiments thereof, it will be apparent to one skilled in the art that various changes and modifications can be made therein without departing from the spirit and scope thereof.

What is claimed is:

1. A rolling bearing apparatus having a cage disposed between an inner ring raceway track and an outer ring raceway track in a freely rotatable manner so as to guide and hold a plurality of rolling elements, wherein said cage is made of a resin composition which comprises a melt-moldable fluororesin as the main component and further contains at least one solid lubricant having an average particle diameter of from 0.1 to 60 µm and a fibrous filler having an aspect ratio of from 3 to 200.

2. The rolling bearing apparatus as in claim 1, wherein said resin composition comprises a melt-moldable fluororesin as the main component and further contains in an amount of from 5 to 40 wt % based on the resin composition, at least one solid lubricant having an average particle diameter of from 0.1 to 60 µm selected from the group consisting of graphite, graphite fluoride, hexagonal boron nitride, fluoromicas, tetrafluoroethylene resins, melamine cyanurate (MCA), amino acid compounds having a laminar crystal structure, silver, lead, molybdenum disulfide and tungsten disulfide and in an amount of from 5 to 40 wt % based on the resin composition, fibrous filler having an aspect ratio of from 3 to 200.

3. The rolling bearing apparatus as in claim 1, wherein the surfaces of the raceway tracks and the rolling elements have been partly or wholly coated with a film comprising at least one solid lubricant selected from the group consisting of graphite, graphite fluoride, hexagonal boron nitride, tetrafluoroethylene resins, silver, lead, molybdenum disulfide, and tungsten disulfide.

4. The rolling bearing apparatus as in claim 1, wherein said fibrous filler is a fiber having an average fiber diameter of from 0.2 to 30 µm.

5. The rolling bearing apparatus as in claim 1, wherein said fibrous filler is a fiber having an average fiber diameter of from 0.3 to 5 µm.

6. The rolling bearing apparatus as in claim 1, wherein said fibrous filler is contained in an amount of from 5 to 40% by weight based on the resin composition.

7. The rolling bearing apparatus as in claim 1, wherein the total content of said solid lubricant and said fibrous filler is from 10 to 60% by weight based on the resin composition.

* * * * *